Nov. 1, 1966
E. L. SINNOTT
3,282,258
ROTARY ENGINE
Filed Aug. 6, 1964
4 Sheets-Sheet 1
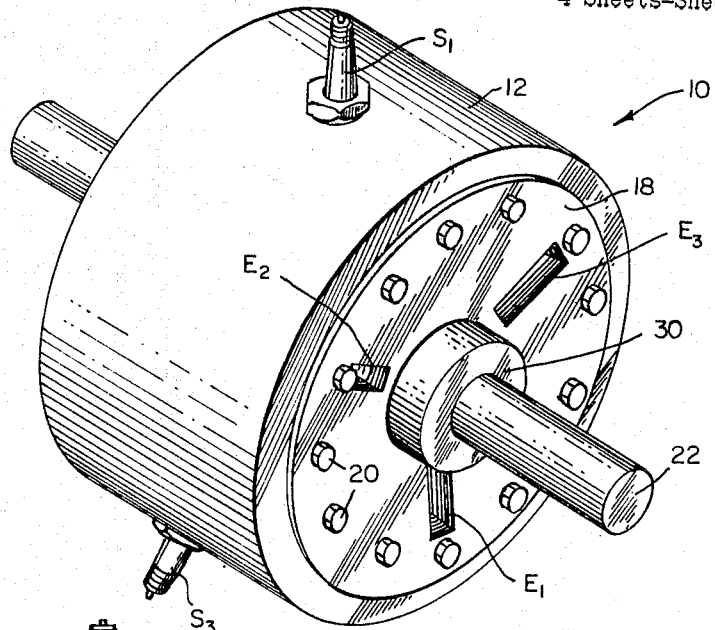
FIG. 1
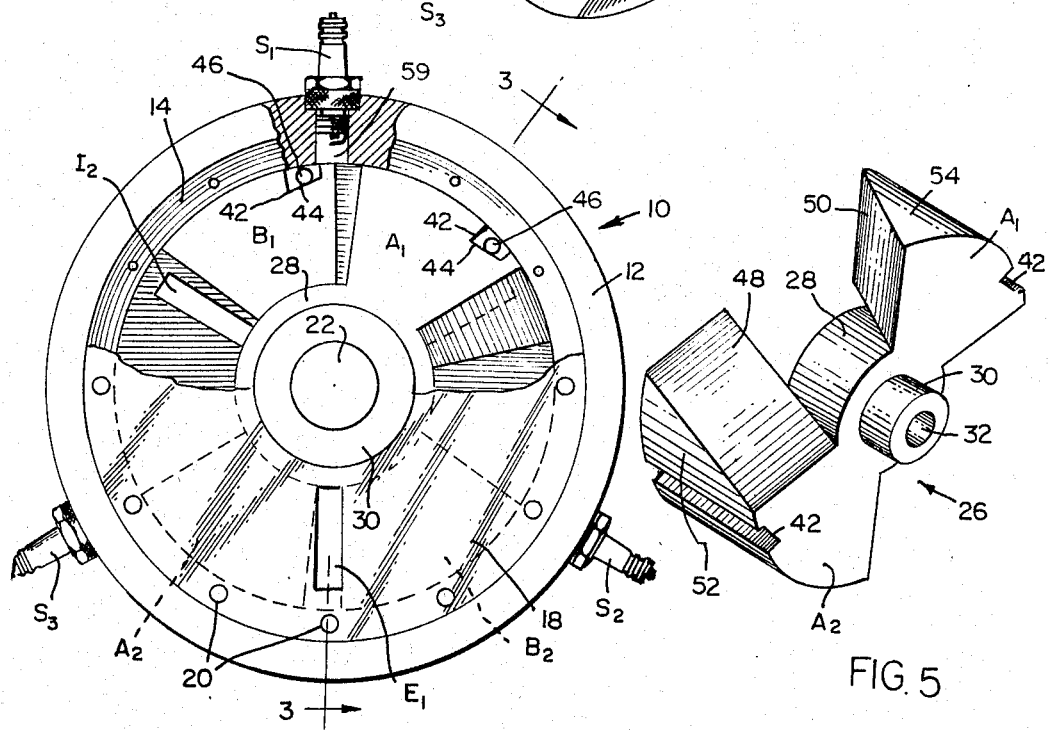
FIG. 2
FIG. 5
INVENTOR:
EDMOND L. SINNOTT
BY,
Russell, Chittick, & Pfund
ATTORNEYS Nov. 1, 1966  E. L. SINNOTT  3,282,258
ROTARY ENGINE
Filed Aug. 6, 1964  4 Sheets-Sheet 2

INVENTOR:
EDMOND L. SINNOTT
BY,
Russell, Chittick, + Pfund
ATTORNEYS

Nov. 1, 1966  E. L. SINNOTT  3,282,258
ROTARY ENGINE

Filed Aug. 6, 1964

INVENTOR
EDMOND L. SINNOTT

BY,

Russell, Chittick, & Pfund.
ATTORNEYS

United States Patent Office 3,282,258
Patented Nov. 1, 1966

3,282,258
ROTARY ENGINE
Edmond L. Sinnott, Sinnott Lane, Marshfield, Mass.
Filed Aug. 6, 1964, Ser. No. 387,977
6 Claims. (Cl. 123—11)

This is a continuation-in-part of my copending application Serial No. 205,323, now abandoned.

This invention relates to internal combustion engines and more particularly to an improved engine of the variable compression rotary type having a plurality of impellers slidably contained within an annular channel.

One object of the present invention is to provide a rotary engine of the aforementioned type capable of operating without use of conventional intake and exhaust valves. This is accomplished by connecting the annular channel within which the impellers rotate to a common source of fuel and a common exhaust outlet by means of radially disposed inlet and exhaust ports extending through opposite sides of the engine housing. The opening and closing of the inlet and exhaust ports in the proper sequence during operation of the engine is controlled by the impellers themselves as they rotate within the annular channel. In this manner, the need for conventional valves and their associated operating mechanisms is obviated and the number of working parts in the engine markedly reduced. This in turn results in a corresponding decrease in operating costs, a factor of considerable importance to users of the engine.

Another object of the present invention is to provide a variable compression ratio engine with improved means for timing ignition of fuel charges following their compression between adjacent impellers. More particularly, rotary engines embodying variable compression ratio features must necessarily incorporate impellers, pistons or vanes which are freely rotatable about the drive shaft in relation to each other. Moreover, since the impellers must also be independently connected in some way to the drive shaft when transmitting power thereto, it also follows that they must at other times be freely rotatable in relation to the drive shaft if the aforementioned variable compression ratio feature is to be maintained. Consequently, it becomes impossible to time the engine ignition systems of variable compression rotary engines in response to rotation of the drive shafts since shaft movement offers no indication of the relative positions of the impellers.

The present invention overcomes this problem by mounting rotors for independent rotation about the drive shaft in a direction opposite to the drive direction. Means are also provided for preventing rotation of the rotors in the same direction relative to the engine housing. The rotors each comprise central hubs with impellers extending radially therefrom into the aforementioned annular channel to which the inlet and exhaust ports are connected. The rotor hubs are further provided with extensions protruding laterally through opposite sides of the engine housing. These extensions rotate with the rotors and therefore are representative of the relative positions of the impellers extending radially therefrom. Consequently, the means for timing the engine may be readily connected to the exposed rotor hub extensions to achieve proper timing of the ignition system without disturbing the variable compression ratio feature.

Further objects of the invention include the provision of a variable compression rotary engine which is simple and inexpensive to construct and efficient to operate.

These and other objects of the present invention will become more apparent as the description proceeds with the aid of the accompanying drawings in which:

FIG. 1 is a perspective view of a rotary engine according to the present invention showing a hub extension surrounding the drive shaft and protruding outwardly from the end plate;

FIG. 2 is a view in end elevation of the engine with portions of one end plate and the cylindrical outer casing broken away to better illustrate structural features of the invention;

FIG. 5 is a perspective view of an engine rotor removed from the engine housing;

Figure 3:
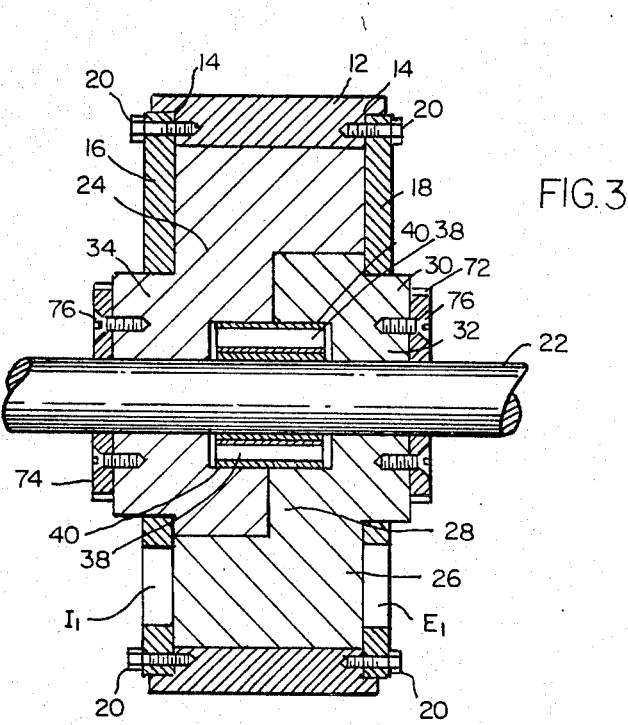
FIG. 3 is a sectional view taken along line 3—3 of FIG. 2.

Referring now to the drawings with initial emphasis on FIGS. 1–5, a preferred embodiment of the rotary engine according to the present invention is generally indicated by the reference numeral 10. The engine is provided with an outer stationary housing which includes a cylindrical shell 12 having peripheral grooves 14 extending around the edges thereof. End plates 16 and 18 provide side enclosures for the housing and are positioned with their inner peripheral surfaces seated within grooves 14. The end plates are fastened in place by a plurality of bolts indicated typically by the reference numeral 20 which extend through radially disposed holes in the end plates to be threaded into aligned holes in shell 12.

A rotatable drive shaft 22 extends axially through the housing formed by cylindrical shell 12 and end plates 16 and 18 and is provided with a pair of rotors 24 and 26 rotatably mounted thereon. Rotor 26 which has been shown removed from the engine housing in FIG. 5, comprises a central hub 28 having diametrically opposed radial impellers $A_1$ and $A_2$ extending therefrom. Hub 28 is further provided with a cylindrical extension 30 and an axial passageway 32 extending therethrough to accommodate drive shaft 22 as shown in FIGS. 1–4.

Although not illustrated in the same manner as FIG. 5, it is to be understood that rotor 24 is similarly constructed with radially disposed impellers $B_1$ and $B_2$ and a cylindrical extension 34 extending from central hub 29 to protrude through the other side of the housing as shown in FIG. 3. When mounted on the drive shaft 22 and positioned within the engine housing, the central hubs 28 and 29 of rotors 24 and 26 cooperate with outer cylindrical casing 12 and end plates 16 and 18 to form an annular channel 36 slidably containing the radially disposed impellers $A_1$, $A_2$, $B_1$ and $B_2$.

As previously mentioned, the rotors are independently connected to the drive shaft when transmitting power thereto. A preferred means of achieving this drive connection is illustrated in FIG. 3, in the form of conventional sprag assemblies 38 positioned in recessed portions 40 of the axial passageways 32 in the central hubs 28 and 29 of the rotors. The sprag assemblies operate to independently lock each rotor to drive shaft 22 when the rotors move in a clockwise direction which for purposes of illustration will hereinafter be referred to as the "drive" direction. As may additionally be seen in FIGS. 2, 4 and 5, the curved end faces of each impeller in slidable contact with the inner surface of cylindrical casing 12 are further provided with laterally extending grooves 42 having sloping bottom surfaces serving as ramps 44 supporting longitudinal rollers 46. It can therefore be seen that the above-described combination of ramps 42 and rollers 46 serve as a means of preventing rotation of the impellers and consequently that of the rotors in a counterclockwise direction relative to the engine housing. More particularly, as viewed in FIG. 2, when an impeller exhibits a tendency to rotate in a counterclockwise direction, roller 46 moves to the right and becomes wedged between ramp 44 and the curved inner surface of cylindrical shell 12, thereby providing both a locking means and an improved seal therebetween. When the impeller is subsequently urged into rotation in a clockwise direction, roller 46 is moved to the left into the deeper part of groove 42 and is therefore disengaged from its wedged position. This permits clockwise rotation of the impellers relative to the cylindrical casing 12 in the "drive" direction.

In view of the above, it can now be seen that each rotor 24 and 26 is independently locked to drive shaft 22 when rotating in a clockwise or drive direction by means of sprag assemblies 38. By the same token, each rotor is independently locked against rotation in a counterclockwise direction relative to cylindrical casing 12 by means of ramp and roller locking assemblies positioned between the end faces of the impellers and cylindrical casing 12. Although clockwise rotation has been adopted as the drive direction, it should be obvious to one skilled in the art that by reversing the slope of ramps 44 and modifying sprag assemblies 38, the engine can easily be made to drive in the counterclockwise direction.

Figure 4:
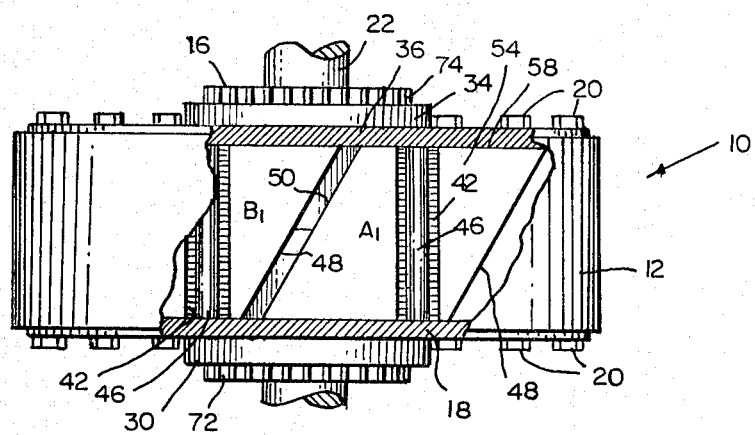
FIG. 4 is a top plan view of FIG. 3 with a portion of the outer casing broken away to show the interrelationship of forward and rear extensions of adjacent impellers.

As can best be seen in FIGS. 4 and 5, each of the impellers which extend radially from the central hubs of the rotors are further provided with angularly disposed front and rear faces 48 and 50. In the preferred embodiment illustrated these faces are substantially parallel and form integral forward and rear wedge-shaped extensions 52 and 54. The wedge-shaped extensions in turn provide each impeller with a leading surface 56 in slidable contact with the inner surface of plate 16 and a trailing surface 58 in slidable contact with the inner surface of end plate 18. It is to be understood that although the wedge-shaped extensions are shown as integral portions of the impellers, they may also be machined as separate parts to be subsequently attached to the impellers without departing from the spirit and scope of the invention.

As can be best seen in FIG. 1, end plate 18 is further provided with three radially disposed exhaust ports which for convenience of reference will hereinafter be designated by the letters $E_1$, $E_2$ and $E_3$. The exhaust ports which extend through end plate 18 into communication with the annular channel 36, may be externally connected to a common exhaust outlet by means of any known manifold system. Since the manifold system is conventional in design and is not considered as part of the present invention, it has been omitted from the drawings in the interests of clarity.

End plate 16 is additionally provided with three radially disposed inlet ports which will hereinafter be referred to by the letters $I_1$, $I_2$ and $I_3$. The inlet ports are oppositely disposed to the aforementioned exhaust ports and lead from annular channel 36 to an exterior source of fuel such as atomized gasoline produced by the conventional combination of a fuel pump and carburetor. The fuel pump and carburetor and the means utilized in connecting them to the inlet ports may be of any conventional design and for this reason have also been omitted from the drawings in the interest of clarity.

The engine ignition system comprises three conventional spark plugs $S_1$, $S_2$ and $S_3$ operatively positioned within radially disposed threaded passageways 59 in cylindrical casing 12. As shown diagrammatically in FIG. 9, the spark plugs are connected by suitable leads to radially disposed fixed contacts 60, 62, 64 and 60', 62', 64' surrounding rotatable breaker discs 66 and 68. The breaker discs are in turn fixed to pinion gears 70 which mesh with drive gears 72 and 74 adapted to be attached to hub extensions 34 and 30 by means of bolts 76 for rotation therewith.

Each of the rotatable breaker discs is suitably grounded and provided with spaced peripheral insulation blocks 78 designed to periodically contact fixed ground brushes 80 and 82 leading to the primary of a conventional ignition coil such as is commonly found in an automobile. The breaker discs are each further provided with radially disposed ignition rotors 84 and 86 connected to the coil secondary and designed to contact the surrounding fixed radially disposed contacts leading to the spark plugs.

Figure 9:
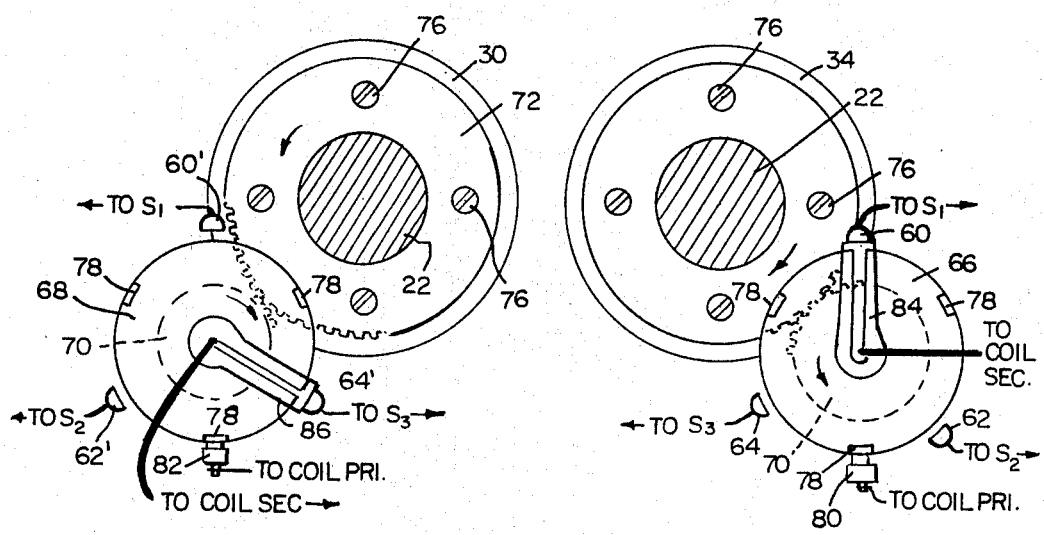
FIG. 9 is a diagrammatic illustration of the timing mechanism for coordinating the operation of the ignition system.

With this arrangement, it can be seen that as engine rotors 24 and 26 rotate, their respective hub extensions 34 and 30 will also rotate, causing the drive gears 74 and 72 attached thereto to impart a corresponding opposite rotation to pinion gears 70 attached to the rotatable breaker discs 66 and 68. As shown in FIG. 9, breaker disc 66 has been rotated to a point where ground brush 80 is in contact with an insulation block 78. This breaks the circuit to the coil primary and causes a high voltage discharge to be fed from the coil secondary through ignition rotor 84 and stationary contact 60 to spark plug $S_1$.

Figure 6:
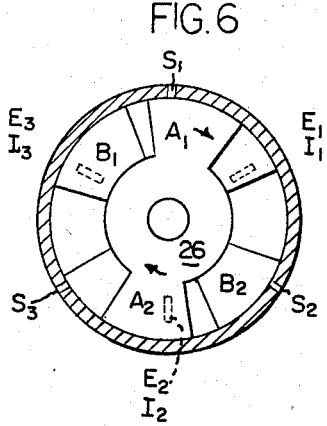
FIG. 6 is a diagrammatic representation showing the relative positions of the engine rotors prior to ignition of a fuel charge compressed between adjacent impellers $B_1$ and $A_1$.
Figure 6A:
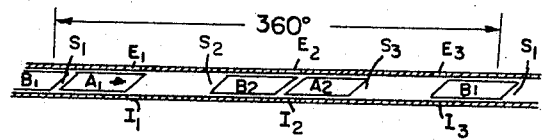
FIG. 6A is a 360° circumferential sectional view of FIG. 6 illustrating the relative positions of the leading and trailing surfaces on the impellers in relation to the inlet and exhaust ports extending through the side of the engine housing.

Having thus described the principal components of an engine constructed in accordance with the present invention, its cycle of operation will now be outlined with the aid of diagrammatic illustrations contained in FIGS. 6 to 8A. FIGS. 6 and 6A show a point in the operational cycle of the engine where a fuel charge has been compressed between impellers $B_1$ and $A_1$ and ignited by spark plug $S_1$. The timing cycle for this ignition phase is illustrated in FIG. 9 where breaker disc 66 has been rotated to place an insulation block 78 in contact with fixed ground brush 80. As outlined above, this in turn resulted in an interruption in current flow through the coil primary, causing the coil secondary to produce a high voltage discharge through ignition rotor 84 and fixed contact 60 to spark plug $S_1$.

After spark plug $S_1$ has fired, rotor 26 having impellers $A_1$ and $A_2$ extending radially therefrom rotates in a clockwise or drive direction under the influence of the expanding gases between impellers $B_1$ and $A_1$. It is to be understood that rotor 24 is now prevented from rotating in a counterclockwise direction relative to cylindrical shell 12 by virtue of the previously described ramp and roller assemblies which are adjusted to the locked position by any tendency of the impellers to rotate in a counterclockwise direction. At the same time, the sprag assembly 38 between central hub 28 and drive shaft 22 locks rotor 26 to the drive shaft as the latter moves in the drive direction.

In addition to driving drive shaft 22 in a clockwise direction, movement of rotor 26 in the drive direction will also result in the following sequence of events; movement of impeller $A_1$ in a clockwise direction will close intake port $I_1$ and thereafter compress a new fuel charge between it and impeller $B_2$. At the same time, burnt gases created by a preceding explosion will be exhausted through exhaust port $E_3$ as impeller $A_2$ approaches impeller $B_1$. Moreover, it should be noted that previous clockwise rotation of rotor 24 has resulted in the trailing surface 58 of impeller $B_1$ closing intake port $I_3$ while the leading surface 56 of impeller $B_2$ has closed exhaust port $E_2$. Consequently, the movement of impeller $A_2$ opens inlet port $I_2$ to draw a new fuel charge in behind it. By the same token, the movement of impeller $A_1$ closes intake port $I_1$ and compresses a fuel charge between it and impeller $B_2$.

Figure 7:
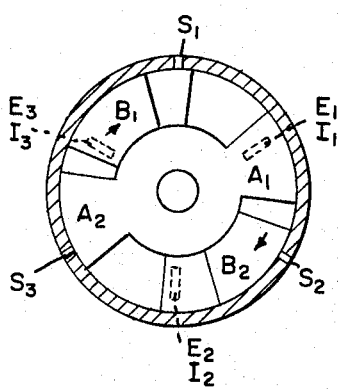
FIG. 7 is a diagrammatic illustration similar to FIG. 6 portraying a different phase in the operation of the engine.
Figure 7A:
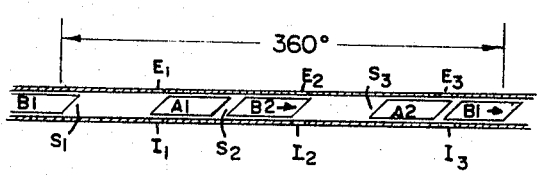
FIG. 7A is a section view of FIG. 7 similar to FIG. 6A.
Figure 8:
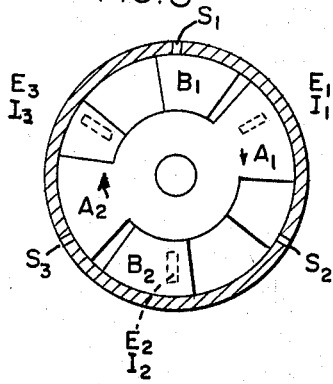
FIG. 8 is a diagrammatic illustration showing the relative positions of the rotors at still another phase of engine operation.
Figure 8A:
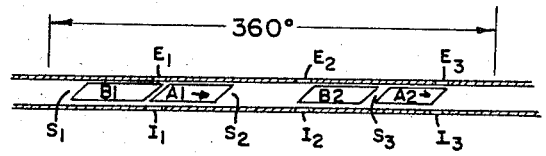
FIG. 8A is a sectional view of FIG. 8 similar to FIGS. 6A and 7A.

As impeller 26 rotates under the influence of the above-described explosion between impeller $B_1$ and $A_1$, cylindrical extension 30 of central hub 28 will also rotate, causing drive gear 72 to drive pinion gear 70 attached to breaker plate 68. This will result in breaker plate 68 being rotated in a direction as illustrated in FIG. 9 until ignition rotor 86 is placed in contact with stationary contact 62'. At this point, an insulation block 78 will be in contact with fixed ground brush 82 with the result that a high voltage charge will again be fed from the coil secondary through ignition rotor 86 and stationary contact 62' to spark plug $S_2$. This point in the operational cycle of the engine is illustrated in FIGS. 7 and 7A.

At this point, the compressed mixture between impellers $A_1$ and $B_2$ has first been ignited, forcing engine rotor 24 and the impellers $B_1$ and $B_2$ extending radially therefrom to rotate in a clockwise or "drive" direction. Again, the sprag assembly 38 between central hub 29 of rotor 24 and drive shaft 22 will lock the former to the latter and result in the drive shaft being driven in the drive direction. At the same time, the ramp roller assemblies associated with impellers $A_1$ and $A_2$ will prevent rotation of rotor 26 in a counterclockwise direction relative to outer cylindrical shell 12. Clockwise rotation of rotor 24 will result in the fuel mixture between impellers $B_2$ and $A_2$ being compressed while the burnt gases between impellers $B_1$ and $A_1$ are exhausted through exhaust port $A_1$. At this stage, it should be noted that because of the movement illustrated in FIGS. 6 and 6A, the trailing surface 58 of impeller $A_1$ has closed off intake port $I_1$ and the leading surface 56 of impeller $A_2$ has closed off exhaust port $E_3$. With this arrangement, movement of impeller $B_1$ results in an opening of intake port $I_3$ and the drawing in of a fuel mixture behind it. At the same time, movement of impeller $B_2$ compresses a fuel mixture between it and stationary impeller $A_2$.

As rotor 24 is rotated in a clockwise direction under the influence of the explosion which has taken place between impellers $A_1$ and $B_2$, the cylindrical extension 34 of central hub 29 is also rotated, causing drive gear 74 to drive pinion gear 66 in a direction as indicated in FIG. 9. This results in ignition rotor 84 being rotated in a counterclockwise direction into contact with stationary contact 64 leading to spark plug $S_3$. This position and the operational sequence of the engine is illustrated diagrammatically in FIGS. 8 and 8A.

At this third point in the operation sequence of the engine, an explosion has just occurred between impellers $B_2$ and $A_2$. Impellers $A_2$ and $A_1$ will now rotate in a clockwise direction as engine rotor 26 again transmits power to drive shaft 22 by virtue of the locked inter-relationship resulting from sprag assembly 38 which is positioned between central hub 28 and the drive shaft. This movement of engine rotor 26 will also result in a fuel mixture being compressed between impellers $A_1$ and $B_1$ and a corresponding exhaust of burnt gases between impellers $A_1$ and $B_2$ through exhaust port $E_2$. In addition, it should be noted that the trailing surface of impeller $B_2$ is now closing intake port $I_2$ while the leading surface of impeller $B_1$ is closing exhaust port $E_1$. Consequently, movement of impeller $A_1$ opens intake port $I_1$ and draws a new fuel mixture in behind it while movement of impeller $A_2$ compresses a mixture between it and impeller $B_1$.

As the engine reaches the end of this particular cycle, there is now a compressed mixture between impellers $A_2$ and $B_1$ in the area adjacent spark plug $S_1$. Spark plug $S_1$ will be fired this time by a high voltage discharge from the coil secondary fed through ignition rotor 86 and stationary contact 60'.

In view of the description presented above, several significant advantages should now be apparent to one skilled in the art. More particularly, by providing leading and trailing surfaces on each rotor impeller, the need to utilize complicated and expensive intake and exhaust valve systems is completely obviated. Moreover, by providing extensions for the central hubs of the engine rotors which protrude outwardly through the sides of the engine housing, means are readily provided for timing engine ignition in response to movement of the rotors, a factor of considerable importance when dealing with variable compression engines of the type described.

It is my invention to cover all changes and modifications of the invention herein chosen for purposes of disclosure which do not depart from the spirit and scope of the invention.

I claim:

1. A rotary internal combustion engine comprising the combination of: an engine housing having a rotatable drive shaft extending axially therethrough; rotors mounted for independent rotation about said shaft within said housing, said rotors having central hubs which cooperate with said housing to define an annular channel therebetween; inlet ports extending through one side of said housing to connect said annular channel with a common fuel supply; exhaust ports opposite to said inlet ports extending through the other side of said housing to connect said annular channel with a common exhaust outlet, said inlet ports and corresponding exhaust ports being disposed such that a line passing through the centers of said ports will be parallel to the axis of said shaft; two diametrically opposed impellers extending radially from the central hubs of each said rotors into said annular channel to subdivide said channel into four chambers, said impellers acting to close said opposed inlet and exhaust ports when positioned directly therebetween; means carried by each said impellers for alternately opening and closing opposed inlet and exhaust ports in a predetermined operational sequence; means for locking said central hubs to said shaft when said rotors rotate in one direction; means for preventing rotation of said rotors relative to said housing in a direction opposite to said one direction; extensions on said central hubs surrounding said drive shafts and protruding outwardly through the sides of said engine housing; ignition means operable to ignite charges of fuel drawn from said inlet ports into said annular channel following the compression thereof between adjacent impellers and said rotors rotate relative to each other in said one direction; and timing means associated with said hub extensions for controlling the operation of said ignition means.

2. An internal combustion engine of the rotary type comprising the combination of: a pair of rotors having central hubs with diametrically opposed impellers extending radially therefrom; a freely rotatable drive shaft extending axially through the central hubs of each said rotors; a housing enclosing said rotors and cooperating with said hubs in providing an annular passageway divided into four chambers by said impellers; inlet ports extending through one side of said housing to connect said annular channel with a common fuel supply; exhaust ports opposite to said inlet ports and extending through the other side of said housing to connect said annular channel with a common exhaust outlet, said inlet ports and corresponding exhaust ports being disposed such that a line passing through the centers of said ports will be parallel to the axis of said shaft; means for locking said shaft against rotation in one direction relative to said rotors; means for locking the rotors against rotation in the same direction relative to said housing; means integral with said impellers for opening and closing said exhaust and inlet ports in the proper operational sequence during operation of said engine, whereby charges of fuel will be admitted through said inlet ports into said chambers to be compressed between adjacent impellers, ignited and thereafter allowed to expand prior to being exhausted through said exhaust ports, and ignition means timed in response to rotation of said central hubs for igniting a fuel charge following its compression between adjacent impellers.

3. A rotary internal combustion engine comprising the combination of: an engine housing having a rotatable drive shaft extending axially therethrough, said housing comprising an outer cylindrical shell closed at either end by spaced opposed end plates; rotors mounted for independent rotation about said shaft within said housing, each said rotors comprising a central hub having diametrically opposed impellers extending radially therefrom, said hubs cooperating with said cylindrical shell and said spaced opposed end plates to provide an annular channel slidably containing said impellers; inlet ports extending through one of said end plates to connect said annular channel with a common fuel supply; exhaust ports opposite to said inlet ports extending through the other of said opposed end plates to connect said annular channel with a common exhaust outlet, said inlet ports and corresponding exhaust ports being disposed such that a line passing through the centers of said ports will be parallel to the axis of said shaft; means integral with said impellers for closing opposed inlet and exhaust ports when said impellers are positioned directly therebetween within said channel; means carried by each said impellers for alternately opening and closing opposed inlet and exhaust ports; extensions on said central hubs protruding outwardly through said spaced opposed end plates; and ignition means timed in response to the rotary motion of said hub extensions for igniting fuel charges compressed between adjacent impellers after having been drawn into said channel from said inlet ports, whereby the gases created by ignition of said compressed fuel charges will expand and impart rotation to said rotors in said one direction.

4. The apparatus as set forth in claim 3 wherein said means carried by each said impellers for alternately opening and closing opposed inlet and exhaust ports is comprised of a first extension on one side of each impeller forming a leading surface in slidable contact with the end plate through which said exhaust ports extend, and a second extension on the other side of each impeller forming a trailing surface in slidable contact with the end plate through which said inlet ports extend.

5. The apparatus as set forth in claim 4 wherein said first and second extensions comprise integrally fabricated portions of said impellers.

6. A rotary internal combustion engine comprising the combination of: a drive shaft having rotor members mounted for independent rotation thereon, each said rotor members comprising a central hub surrounding said drive shaft with oppositely disposed impellers extending radially therefrom; an engine housing enclosing said rotors and comprising an outer cylindrical shell closed at either end by oppositely disposed end plates, said shell, end plates and central hub members cooperating to form an inner annular channel divided into a plurality of chambers by said impellers, the volume of said chambers being variable and governed by the relative positions of said rotors rotating within said housing; means for locking said shaft against rotation in one direction relative to said rotors; means for locking the rotors against rotation in the same direction relative to said housing; inlet ports extending through one of said end plates to connect to said annular channel with a common fuel supply; exhaust ports opposite to said inlet ports and extending through the other of said end plate to connect said annular channel with a common exhaust outlet, said inlet ports and corresponding exhaust ports being disposed such that a line passing through the centers of said ports will be parallel to the axis of said shaft, said opposed inlet and exhaust ports closed by impellers positioned directly therebetween within said annular channel; means carried by said impellers for alternately opening and closing opposed inlet and exhaust ports; extensions on said central hubs surrounding said drive shaft and protruding outwardly through said end plates; ignition means operable to ignite charges of fuel drawn through said inlet ports into said annular channel after the charges have been compressed within chambers formed between adjacent impellers as said rotors rotate relative to each other within said housing; and timing means associated with said hub extensions for controlling the operation of said ignition means.

References Cited by the Examiner

UNITED STATES PATENTS

| | | | |
|---|---|---|---|
| 1,212,649 | 1/1917 | Krikorian | 123—11 |
| 2,088,779 | 8/1937 | English | 123—11 |
| 2,737,161 | 3/1956 | Gaskell | 123—11 |
| 2,895,457 | 7/1959 | Mallinckrodt | 123—11 |
| 2,968,290 | 1/1961 | Bradshaw | 60—13 X |
| 3,087,671 | 4/1963 | Myles | 132—11 X |

FOREIGN PATENTS 419,722   3/1910   France.

CARLTON R. CROYLE, *Acting Primary Examiner.*

SAMUEL LEVINE, *Examiner.*

FREDERICK T. SADLER, *Assistant Examiner.*